United States Patent [19]

Edwards

[11] Patent Number: 5,780,938
[45] Date of Patent: Jul. 14, 1998

[54] DUPLEX ENCODER/DECODER FOR ALTERNATING CURRENT SYSTEMS

[75] Inventor: Walter J. Edwards, Floreat, Australia

[73] Assignee: RCO Parts, Inc., Pleasonton, Calif.

[21] Appl. No.: 770,708

[22] Filed: Dec. 19, 1996

Related U.S. Application Data

[60] Provisional application No. 60/008,970 Dec. 20, 1995.
[51] Int. Cl.$^6$ ............................................. H02J 3/38
[52] U.S. Cl. .......................... 307/18; 307/11; 307/12; 307/38; 307/29; 307/40; 239/63; 137/1; 137/47
[58] Field of Search .................... 307/18, 11, 12, 307/38, 40, 25, 26, 29, 19, 65; 340/825.76; 239/63, DIG. 15; 137/1, 47

[56] References Cited

U.S. PATENT DOCUMENTS

| | | | |
|---|---|---|---|
| 3,729,710 | 4/1973 | Sherwin | 340/825.76 |
| 3,755,686 | 8/1973 | Woods | 307/18 |
| 4,190,884 | 2/1980 | Medina | 239/63 |
| 4,215,276 | 7/1980 | Janeway | 307/40 |
| 4,348,582 | 9/1982 | Budek | 307/40 |
| 4,356,402 | 10/1982 | Morimoto et al. | 307/19 |

*Primary Examiner*—Brian Sircus
*Assistant Examiner*—Albert W. Paladini
*Attorney, Agent, or Firm*—G. Donald Weber, Jr.

[57] ABSTRACT

A duplexing encoder/decoder pair for operating two loads independently, from two independent current sources, and using two conductors to connect the current sources and return to the loads, in general, and for expanding automatic sprinkler systems comprising a number of solenoid valves electrically connected to an irrigation controller for the timing and switching thereof, in particular.

17 Claims, 1 Drawing Sheet

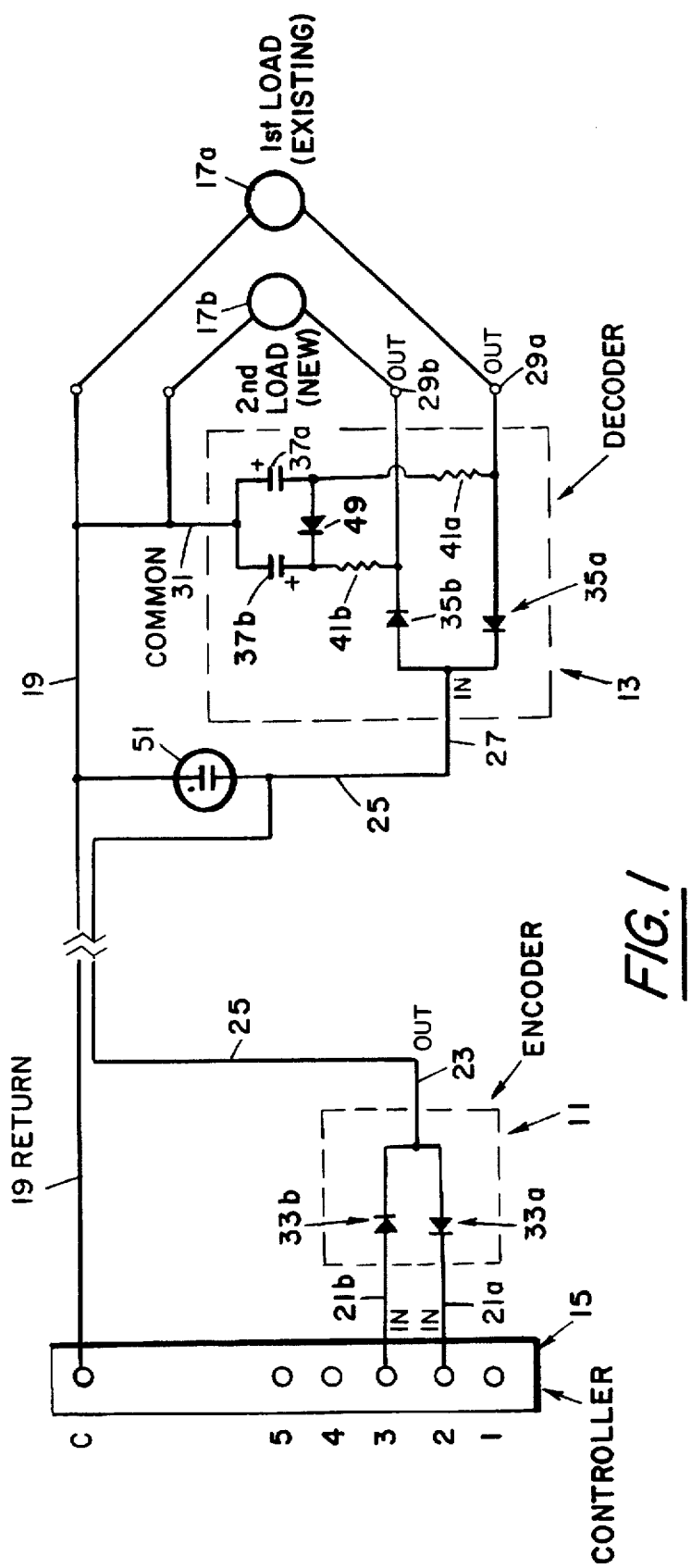
FIG. I

DUPLEX ENCODER/DECODER FOR ALTERNATING CURRENT SYSTEMS

This application claims the benefit of U.S. Provisional application Ser. No. 60/008,970, filed on Dec. 20, 1995.

BACKGROUND

1. Field of the Invention

This invention relates to a duplexing encoder/decoder pair for alternating current systems, in general, and to a system for operating two loads independently, from two independent current sources and a single return, while using two conductors to connect the current sources and return to the loads, in particular. The invention has particular, but not exclusive, application in the field of automatic sprinkler systems comprising a number of solenoid valves electrically connected to an irrigation controller for the timing and switching thereof.

2. Prior Art

The solenoid valves utilized in such automatic sprinkler systems require energization of the solenoid to operate the valve. Most solenoids used in this application are actuated and held by a 24 volt AC current supplied by the irrigation controller. Typically, one conductor (common) is required to connect each load (solenoid) to each switched current source (output) of the irrigation controller, and one conductor is required to connect the return from all of the loads to the irrigation controller.

A previous attempt has been made to operate two independent AC loads from two independent current sources and a return utilizing two conductors to interconnect the current sources and return with the alternating current loads. This product is manufactured by Transitional Systems Manufacturing Company of West Sacramento, Calif., under the trademark "Doubler" and is described in U.S. Pat. No. 4,575,004. The apparatus described in U.S. Pat. No. 4,575,004 is a complex mechanical device incorporating latching switching means, viz. electromechanical latching relays. When this apparatus is used it increases the electrical load on the circuit over and above that formerly presented by the solenoid or solenoids connected in parallel to the irrigation controller. Moreover, such electromechanical relays are subject to malfunction and/or failure over extended periods of time. In addition, the apparatus described in U.S. Pat. No. 4,575,004 cannot be used to switch between two alternating current loads connected thereto unless there is a delay between the first alternating current load being switched off and the second alternating current load being energized. Thus, in most modern irrigation controllers, the apparatus described in U.S. Pat. No. 4,575,004 could not be used to switch between adjacent outputs to solenoid valves in the switching sequence of the irrigation controller.

SUMMARY OF THE INSTANT INVENTION

It is an object of the invention to provide a device which overcomes the aforementioned difficulties.

In accordance with one aspect of the present invention there is provided a duplex encoder/decoder pair for interfacing a first current source and a second current source with a first load and a second load over a single conductor. The duplex encoder/decoder pair comprises an encoder portion having a first input for connection to said first current source, and a second input for connection to said second current source, and an output for connection to the single conductor. The duplex encoder/decoder pair also comprises a decoder portion having an input for connection to the conductor, a first output for connection to a first load and a second output for connection to a second load. The encoder portion is adapted for selectively conducting current from the first encoder input to the encoder output and alternatively from the encoder output to the second encoder input. The decoder portion is adapted for selectively conducting current only from the decoder input to the first decoder output and alternatively from the second decoder output to the decoder input.

In this manner, viewing the circuit arrangement current flow using the conventional current convention, a positive going voltage at the first decoder input will be available at the first decoder output, and a negative going voltage at the second encoder input will be available at the second decoder output. Conversely, negative going voltage at the first encoder input and a positive going voltage at the second encoder input will be blocked. As will be appreciated, a return conductor will be required between the loads and the return of the current supply.

Preferably the duplex encoder/decoder pair employs diode means to control the conduction direction of electrical current therethrough.

The decoder portion may also include a return connection and a first smoothing circuit connected between the first output and the return connection and a second smoothing circuit connected between the second output and the return connection. Typically, the first and second smoothing circuits each comprise capacitor means.

In accordance with another aspect of the present invention, there is provided a method of independently controlling two loads connected to two power supplies by a source conductor and a return conductor, comprising connecting an encoder portion between a source conductor and the power supplies, and connecting a decoder portion between a source conductor and the loads.

In accordance with a further aspect of the invention, there is provided a method of independently controlling two loads connected to two alternating current power supplies by a source conductor and a return conductor. The method and apparatus comprises allowing only the positive going voltage from one power supply to reach one load while blocking the negative going voltage from the one power supply reaching the source conductor. Conversely, this method and apparatus comprises allowing only the negative going voltage from a second power supply to reach a second load while blocking the positive going voltage from reaching the source conductor. Also, the method prevents negative going voltage from reaching the one load from the source conductor and preventing positive going voltage from reaching the other load from the source conductor.

BRIEF DESCRIPTION OF THE DRAWINGS

The sole FIGURE is a schematic circuit diagram of a preferred embodiment of the instant invention including optional features.

DESCRIPTION OF A PREFERRED EMBODIMENT

The invention is described relative to a specific embodiment thereof given with reference to the drawing which is a circuit schematic of a duplex encoder/decoder pair for use in an automatic sprinkler system for watering gardens, lawns and the like. The particular application is directed to the addition of an additional sprinkler to an existing system without the necessity of extensive digging and/or trenching to run control wires. Other applications of the system are contemplated.

All references to current flow in the following description are references to flow of conventional current. That is, current flow is from a higher to a lower potential, including from a higher positive potential to a lower positive potential or a negative potential, or from a less negative potential to a more negative potential.

The embodiment is directed towards a duplexing encoder/decoder pair comprising an encoder circuit 11 and a decoder circuit 13 connected between an irrigation controller 15 and first and second loads in the form of solenoid valves 17a and 17b, respectively. Typically, one of the solenoid valves, e.g. valve 17a, is in place while the other solenoid valve, e.g. valve 17b, is to be added.

Referring to the irrigation controller 15 only the water zone or station output current sources for stations 1–5 inclusive are shown, together with the connection C for the return conductor 19. Other portions of a typical controller are omitted from this description for convenience.

The encoder circuit 11 has its inputs 21a and 21b connected to station outputs 2 and 3 of the irrigation controller 15. The station outputs 2 and 3 represent current sources connected thereto. The output 23 of the encoder circuit 11 is connected to one end of a single conductor 25 which is, typically, connected already to the existing solenoid 17a.

The other end of conductor 25, in this system is re-connected to the single input 27 of decoder circuit 13. The decoder circuit 13 has two outputs 29a and 29b which are connected to the solenoid valves 17a and 17b, respectively. The decoder circuit 13 also has a common connection 31 which is connected to the return conductor 19 together with the existing return connections of the solenoid valves 17a and 17b.

In a preferred embodiment, the encoder circuit 11 comprises a pair of diodes 33a and 33b. Diode 33a has the cathode thereof connected to input 21a. Conversely, diode 33b has the anode thereof connected to input 21b. The other terminals of diodes 33a and 33b are connected together and to the encoder output 23.

Similarly, the decoder circuit 13 comprises a pair of diodes 35a and 35b connected in a similar fashion to the diodes 33a and 33b. That is, diode 35a has the anode thereof connected to one output 29a and diode 35b has the cathode thereof connected to output 29b. The other terminals of the diodes 35a and 35b are connected together and to input 27 of decoder 13.

In this embodiment, the decoder circuit 13 also includes capacitors 37a and 37b connected from the outputs 29a and 29b respectively to the common connection 31. The capacitors 37a and 37b are of the electrolytic type, with attention being paid to polarity in the circuit. The values of the capacitors 37a and 37b are determined by the expected current load and should be sufficient to provide adequate smoothing to the resultant half rectified waveforms appearing at the outputs 29a and 29b of the decoder circuit 13.

In conventional fashion, the irrigation controller 15 provides timing and switching of, typically, 24 volts AC at any one of the terminals 1 through 5 (or more, not shown). The AC voltage is measured between respective terminals and the common connection C. When 24 volts AC is provided between terminal 2 and common connection C, the voltage is half wave rectified by diode 33a to produce a voltage waveform at the encoder output 23 which is at negative potential relative to the return conductor 19. This voltage is supplied to decoder 13 via conductor 25. In the decoder circuit 13 the diode 35a conducts, resulting in solenoid valve 17a being energized.

Conversely, when 24 volts AC appears between terminal 3 and common connection C, this voltage signal is half wave rectified by diode 33b to produce a positive potential at the encoder output 23 relative to the return conductor 19. This voltage is supplied to decoder 13 via conductor 25. Thus, the diode 35b is rendered conductive, resulting in solenoid valve 17b being actuated.

Of course, it can be seen that a positive voltage at terminal 2 cannot inadvertently activate either solenoid nor can negative voltage at terminal 3. That is, the diode networks in the respective encoder and decoder permit unilateral conduction only between designated terminals and solenoids. Conduction between other terminals and solenoids is not permitted.

In the embodiment shown, the resistors 41a and 41b are connected in series with capacitors 37a and 37b, respectively. These resistors can be omitted in some applications. However, the resistors tend to provide a current limiting effect when the decoder is activated. The current limiting effect may be useful to prevent the activation of overload protection fuses by turn-on current surges in the system.

Likewise, an additional diode network 49 is connected across capacitors 37a and 37b to provide a rapid discharge circuit therefor. The rapid discharge of the capacitors provides supplemental power to the solenoid coil which is activated through the decoder 13. This power supplement reduces the load on the controller 15 and permits adjacent stations on the controller to be utilized.

The arrestor device 51 is connected across the lines of the conductor path comprising conductor 25 and return 19. A gas arrestor is contemplated but other devices are applicable. The arrestor 51 is considered to be an optional feature which may be desirable to provide protection against large transient signals, such as a lightning strike or the like.

As can be seen with this arrangement, the two solenoid valves 17a and 17b may be independently operated from the irrigation controller 15 through the single conductor 25 and the return conductor 19. Without the use of the duplex encoder/decoder pair, it would be necessary to provide three separate conductors between the two solenoid valves 17a and 17b, the output connections 2 and 3 and common connection C of the irrigation controller 15.

Use of the duplex encoder/decoder pair offers significant advantages in two areas. The first is a cost saving where exceptionally long runs of wiring are required between an irrigation controller and solenoid valves. However, the major advantage is that apart from any effort required to connect the encoder and decoder circuits, existing irrigation systems can be extended by adding a watering zone, without having to dig up existing wiring or dig trenches to add further wiring to provide connection between the new solenoid valve and the exising irrigation controller. That is, the additional sprinkler unit is merely added to an existing unit and the encoder and decoder circuits are installed.

The diodes 33 and 35 may be 1N4001 where the voltage across them is not to exceed 50 volts and the current passed through not to exceed 1 ampere. Conversely, a higher voltage rated 1N4007 diode is prefered where the current drawn by the load may exceed 1 ampere (peak). Likewise, it would also be necessary to utilize a diode with a higher current rating. The capacitors 37a and 37b are, typically, valued at 100 microfarad and 63 volts if the output load of the decoder circuit 13 does not exceed 0.5 ampere. Typically, a capacitor with a rated voltage of 35 V to 100 V would prove suitable, leaving a wide safety margin for maximum reliability.

In a preferred embodiment, the components contained within both the encoder 11 and the decoder 13 should be encapsulated in a watertight, waterproof housing (represented by the dashed outlines) so that the decoder circuit 13 may be buried in the ground, along with the associated solenoid valves 17a and 17b. The encoder is then disposed adjacent to the control unit.

It should be appreciated that the scope of the invention is not limited to the embodiment described herein. In particular, the invention has application in other areas besides use in automatic sprinkler systems. The invention would prove equally suitable for use in any application utilizing one or more AC supplies and one or more AC loads which are operable on half wave rectified power supplies. Such an application would include the area of low voltage outdoor lighting which has recently become popular.

Thus, there is shown and described a unique design and concept of duplex encoder/decoder unit for alternating current systems. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. An interfacing network for respectively interconnecting first and second sources with first and second loads with a two conductor connection, comprising encoder means having first and second inputs for connection to the first and second sources, respectively;

decoder means having first and second outputs for connection to the first and second loads, respectively, said encoder means having a single output, said decoder means having a single input, conductor means connected between said single input and said single output, and common conduction means connected between said first and second sources and said first and second loads.

2. A retrofit mechanism for use with an automatic sprinkler system having a plurality of sprinkler heads connected to a water supply via electrically operated valves and an electrical controller for programming the operation of said valves, said retrofit mechanism comprising first unilateral conducting means which selectively supplies energizing power from the controller to one of two conductive paths, second unilateral conducting means which selectively receives power from said one conductive path, and conductor means electrically connecting the valve to one of said conductive paths.

3. A retrofit mechanism as recited in claim 1 wherein said unidirectional conducting means comprises diode means.

4. A retrofit mechanism as recited in claim 3 wherein, said unidirectional conducting means further comprises one or more capacitors.

5. The method of adding at least one sprinkler head to an existing automatic sprinkler system having an electrical controller and at least one existing electrically operated valve for controlling the flow of water to one or more sprinkler heads and individual wires from said controller to each of said existing valves wherein the method comprises;

mounting unilateral electrical conducting means for alternatively selecting one of two or more conductive paths when said unilateral electrical conducting means is energized, connecting said unilateral electrical conducting means to one of said individual wires from said controller to one of said existing valves so that said unilateral electrical conducting means is selectively activated to conduct therethrough, connecting by conductive means one of said alternate conducting paths to one of said said existing valves, and connecting by conductive means another of said alternate conducting paths to said added electrically operated valves whereby said unilateral electrical conducting means alternatively energizes said existing valve and said added valve depending upon the level of the applied control signal at said controller.

6. The network recited in claim 1 wherein, said encoder means includes unilaterally conducting means for selectively connecting the single output to only one of said first and second inputs as a function of the level of the signals at said first and second inputs.

7. The network recited in claim 6 wherein, said decoder means includes unilaterally conducting means for selectively connecting the single input to only one of said first and second loads as a function of the level of the signals at said first and second inputs.

8. The network recited in claim 7 wherein, said encoder means comprises a pair of diodes connected in opposite polarity between said first and second inputs and said single output, and said decoder means comprises a pair of diodes connected in opposite polarity between said first and second loads and said single input.

9. The network recited in claim 8 wherein, said first and second loads comprise a pair of solenoid valves (17a, 17b).

10. The network recited in claim 1 including, rapid discharge means connected between said common conduction means and said first and second outputs to provide supplemental power to one of said first and second outputs.

11. The network recited in claim 10 wherein, said rapid discharge network comprises energy storage means.

12. The network recited in claim 11 wherein, said rapid discharge network includes diode means connected across said energy storage means.

13. The network recited in claim 1 including, arrestor means connected between said common conduction means and said conductor means to protect against large transient signals therebetween.

14. The network recited in claim 13 wherein, said arrestor means comprises a gas arrestor device.

15. The network recited in claim 12 including, current limiting means connected to said energy storage means.

16. The network recited in claim 15 wherein, said energy storage means comprise at least one capacitor.

17. The network recited in claim 15 wherein, said current limiting means comprise at least one resistor.

* * * * *